United States Patent
Chanussot et al.

(10) Patent No.: US 10,178,382 B2
(45) Date of Patent: Jan. 8, 2019

(54) METHOD FOR PERFORMING DIAGNOSIS OF A CAMERA SYSTEM OF A MOTOR VEHICLE, CAMERA SYSTEM AND MOTOR VEHICLE

(71) Applicant: VALEO Schalter und Sensoren GmbH, Bietigheim-Bissingen (DE)

(72) Inventors: Lowik Chanussot, Paris (FR); Julien Rebut, Yerres (FR)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 260 days.

(21) Appl. No.: 15/308,709

(22) PCT Filed: Apr. 28, 2015

(86) PCT No.: PCT/EP2015/059126
§ 371 (c)(1),
(2) Date: Nov. 3, 2016

(87) PCT Pub. No.: WO2015/169636
PCT Pub. Date: Nov. 12, 2015

(65) Prior Publication Data
US 2017/0180723 A1    Jun. 22, 2017

(30) Foreign Application Priority Data
May 8, 2014    (DE) .......................... 10 2014 106 506

(51) Int. Cl.
*H04N 17/00* (2006.01)
*G06K 9/00* (2006.01)
(Continued)

(52) U.S. Cl.
CPC ....... *H04N 17/002* (2013.01); *G06K 9/00791* (2013.01); *G06K 9/03* (2013.01);
(Continued)

(58) Field of Classification Search
CPC ..... G06K 9/00791; G06K 9/03; H04N 17/002
(Continued)

(56) References Cited

U.S. PATENT DOCUMENTS

| 7,724,962 B2 | 5/2010 | Zhu et al. |
| 8,081,209 B2 | 12/2011 | Ji et al. |

(Continued)

FOREIGN PATENT DOCUMENTS

| DE | 101 17 250 A1 | 10/2002 |
| DE | 10 2009 048 117 A1 | 4/2011 |
| EP | 0 757 635 A1 | 2/1997 |

OTHER PUBLICATIONS

International Search Report issued in PCT/EP2015/059126, dated Jul. 9, 2015 (3 pages).
(Continued)

*Primary Examiner* — Jeffery A Williams
(74) *Attorney, Agent, or Firm* — Osha Liang LLP

(57) ABSTRACT

The invention relates to a method for performing a diagnosis of a camera system (2) of a motor vehicle (1) by: providing at least one image (BD) by means of a camera (3); detecting an object (6) in the image (BD) by means of an image processing device; providing sensor data (SD) by means of at least one sensor (7) of the motor vehicle (1), wherein the sensor data (SD) characterizes environmental conditions of the motor vehicle (1); first classifying the object (6) and herein associating the object (6) with a class (K1, K2, K3, K4) among several predetermined classes (K1, K2, K3, K4) depending on the environmental conditions, wherein the classes (K1, K2, K3, K4) differ from each other with respect to the environmental conditions; second classifying the at least one object (6) and herein associating the object (6) with one of the classes (K1, K2, K3, K4) based on the image (BD) and independently of the sensor data (SD) by a classification device (12) using a predetermined classification model (11);
(Continued)

Figure 1:
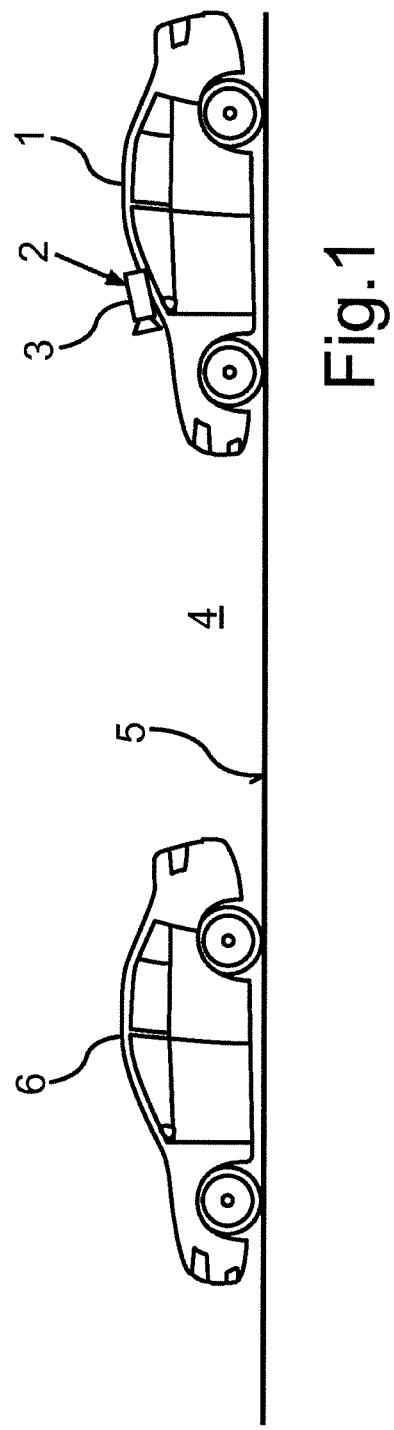

and comparing classification results of the first and the second classification and performing a diagnosis depending on the comparison.

12 Claims, 4 Drawing Sheets

(51) Int. Cl.
    *G06K 9/03*     (2006.01)
    *G06K 9/62*     (2006.01)
    *G06K 9/46*     (2006.01)
    *B60T 8/171*     (2006.01)
    *G08G 1/16*     (2006.01)

(52) U.S. Cl.
    CPC .......... *G06K 9/4661* (2013.01); *G06K 9/6215* (2013.01); *G06K 9/6256* (2013.01); *G06K 9/6267* (2013.01); *G06K 9/6293* (2013.01); *B60T 8/171* (2013.01); *G06K 2009/4666* (2013.01); *G08G 1/166* (2013.01)

(58) Field of Classification Search
    USPC .......................................... 348/148
    See application file for complete search history.

(56) References Cited

U.S. PATENT DOCUMENTS

| | | |
|---|---|---|
| 2004/0252027 A1 | 12/2004 | Torkkola et al. |
| 2008/0042813 A1 | 2/2008 | Wheatley et al. |
| 2012/0119894 A1 | 5/2012 | Pandy |
| 2012/0242832 A1* | 9/2012 | Datta .................. B60Q 1/143 348/148 |

OTHER PUBLICATIONS

Written Opinion of the International Searching Authority issued in PCT/EP2015/059126, dated Jul. 9, 2015 (7 pages).

German Search Report issued in DE 10 2014 106 506.9 dated Mar. 18, 2015 (7 pages).

\* cited by examiner

METHOD FOR PERFORMING DIAGNOSIS OF A CAMERA SYSTEM OF A MOTOR VEHICLE, CAMERA SYSTEM AND MOTOR VEHICLE

The invention relates to a method for performing a diagnosis of a camera system of a motor vehicle. In addition, the invention relates to a camera system formed for performing such a method, as well as to a motor vehicle with such a camera system.

Camera systems for motor vehicles are already known from the prior art. Presently, the interest is directed to a camera system, by means of which objects in the environment of the motor vehicle can be detected. To this, front cameras are in particular employed, which usually provide images of an environmental region in front of the motor vehicle. This sequence of images is processed by means of an electronic image processing device, which detects target objects in the images. To this, the images are subjected to an object detection algorithm. Such detection algorithms are already prior art and are for example based on pattern recognition. In order to detect a target object, first, so-called characteristic points can be extracted from the image and then a target object can be identified based on these characteristic points. As an example, therein, the following algorithms can be mentioned: Adaboost and HOG-SVM.

If a target object is identified in an image of the camera, thus, this target object can also be tracked over the subsequent images of the sequence. Therein, the target object is detected in each image, wherein the detection in the current image has to be associated with the detection from the previous image. By tracking the target object, the current position of the target object in the image frame and thus also the current relative position of the target object with respect to the motor vehicle are always known. Therein, for example, the Lucas-Kanade method can be used as the tracking algorithm.

A mentioned camera system with a front camera can be used as the collision warning system, by means of which the driver can be warned of a risk of collision with the target object. Such a collision warning system can for example output warning signals in order to acoustically and/or optically and/or haptically inform the driver about the detected risk of collision. Additionally or alternatively, the camera system can also be used as an automatic brake assist system, which is adapted to perform automatic brake interventions of the motor vehicle due to the detected risk of collision. As the measure of the current risk of collision, the so-called time to collision can for example be used, that is a period of time, which is presumably needed by the motor vehicle to reach the target object. This time to collision can be calculated from the estimated distance of the target object as well as from the relative speed.

A camera system for detecting objects is for example known from the document US 2012/0119894 A1. This camera system is formed for classifying the detected objects and can associate each object with a class or category among three possible classes. To this, data of a radar sensor is also used.

A method, in which images of a camera on the one hand and data of a radar sensor on the other hand are combined with each other, is furthermore known from the document U.S. Pat. No. 8,081,209 B2. Based on the data of the radar sensor, here, regions of interest are determined, in which the images are then processed and in which therefore the objects are searched.

A method for classifying objects with the aid of a classifier is known from the document U.S. Pat. No. 7,724,962 B2. The training of the classifier is effected based on brightness values of the images, wherein test image data is for example divided in three categories with respect to the brightness.

A particular challenge in today's camera systems is in performing a diagnosis of the camera system and thus being able to check the camera system for the reliability of the object recognition. In particular, the diagnosis of the known object detection algorithms as well as of the classification algorithms has proven problematic. If such algorithms are used in a camera system of a motor vehicle, thus, in the prior art, there is basically no longer any possibility of checking these algorithms for possible detection errors and/or classification errors.

It is the object of the invention to demonstrate a solution, how a camera system of a motor vehicle can be particularly reliably diagnosed and thus checked for its functionality.

According to the invention, this object is solved by a method, by a camera system as well as by a motor vehicle having the features according to the respective independent claims. Advantageous implementations of the invention are the subject matter of the dependent claims, of the description and of the figures.

A method according to the invention serves for performing a diagnosis of a camera system of a motor vehicle. At least one image of an environmental region of the motor vehicle is provided by means of a camera of the camera system. An electronic image processing device of the camera system detects at least one object external to vehicle in the image, in particular using a detection algorithm. Therein, basically, any detection algorithm can be used such that presently the detection algorithm is not elaborated in more detail. In addition, sensor data is provided by means of at least one sensor of the motor vehicle in particular separate from the camera, wherein the sensor data characterizes environmental conditions of the motor vehicle and thus depends on the current environmental conditions. Then, a first classification of the at least one object is performed by associating the object with a class among several predetermined classes depending on the environmental conditions. Therein, the classes differ from each other with respect to the environmental conditions. Independently of that, a second classification of the at least one object is performed by associating the object with one of the mentioned classes independently of the sensor data and thus solely based on the image. To this, a classification device or a classifier is used, which applies a predetermined classification model. The classification result of the first classification is then compared to the classification result of the second classification, and the diagnosis is performed depending on this comparison.

According to the invention, a diagnostic method is accordingly provided, in which a detected object is classified with respect to the same classes with two classification methods independent of each other. For classifying the detected object, sensor data of a vehicle sensor is taken into account on the one hand, which describes the environmental conditions and thus the scene at the time of capture of the image. This first classification can be performed by means of a splitter without much effort and is particularly little prone to error, since sensor data is used for determining the environmental conditions and the classification thus can be effected directly depending on the measured, known environmental conditions. On the other hand, the object is classified with the aid of a predetermined classification model or classification algorithm (classifier), wherein only the image or the detected object is taken as a basis for this second classification, without using the sensor data to this. If a deviation between the two classification results is determined, thus, this presents an indication of a possible error of the image processing device and/or the classification device. With the method according to the invention, such errors can be diagnosed without much effort and particularly reliably, and in case of error, a warning message can be output to the driver. An erroneous operation of the camera system can thus be prevented.

Preferably, the camera is a front camera, which is in particular disposed behind a windshield of the motor vehicle, for example directly on the windshield in the interior of the motor vehicle. Then, the front camera captures the environment in direction of travel or in vehicle longitudinal direction in front of the motor vehicle. This can in particular imply that a camera axis extending perpendicularly to the plane of the image sensor is oriented parallel to the vehicle longitudinal axis.

Preferably, the camera is a video camera, which is able to provide a plurality of images (frames) per second. The camera can be a CCD camera or a CMOS camera.

Thus, in an embodiment it can be provided that, if it is detected by the camera system that the object was associated with a different class by the first classification than by the second classification, an error signal is generated by the camera system. This error signal can for example generate a warning message in an instrument cluster of the motor vehicle. Additionally or alternatively, such an error signal can also result in the camera system being deactivated and thus put out of service in order to avoid erroneous detections.

The detected object is classified with respect to several predetermined classes, wherein the classes differ from each other in the environmental conditions of the motor vehicle. Therein, the object is associated with a class among the several classes. In particular, in this context, it can be provided that the several classes differ from each other in a brightness of the environmental region. A class can for example include objects, which are detected in a bright environment (in the daytime). Another class can for example include objects, which are detected in a dark environment (at night). Several degrees of brightness can also be defined.

Additionally or alternatively, the classes can also differ from each other in atmospheric conditions of the environmental region and thus in weather conditions. Therein, one of the classes can for example associated with rain, while another class can for example include objects, which are detected in dry environment. Here too, multiple intermediate stages can be defined.

If the above mentioned embodiments are combined with each other, thus, a first class can for example include objects, which are detected in a dark environment and in rain, while another class can include objects, which are detected in the daytime and in a dry environment.

It proves particularly advantageous if the following data is provided as sensor data and taken into account in the first classification of the object:

Data indicating a current operating state of a headlight of the motor vehicle, and/or
data characterizing a current operating state of a windshield wiper of the motor vehicle, and/or
sensor data of a rain sensor, and/or
sensor data of a brightness sensor of the motor vehicle.

The above mentioned data has the advantage that the brightness of the environment and/or the current weather conditions can be determined based on this data. Namely, this data allows conclusions to the brightness of the environment and/or to the atmospheric conditions of the environmental region and thus allows reliable (first) classification of the at least one object With respect to the classification model, by means of which the second classification is performed, the following embodiments can be provided:

For example a HOG classifier (Histogram of Oriented Gradients) and/or an SVM classifier (Support Vector Machine) and/or a classifier based on a classification tree method can be used as the classification model. These algorithms can be trained on the one hand and allow reliable and precise classification of objects on the other hand.

In particular, an algorithm is used as the classification model, which is trained with test image data with respect to the classification. In training the algorithm, preferably, a test database is provided, which includes test image data, that is a very great number of images. This test image data include a plurality of objects, which are detected by means of a corresponding object detection algorithm and then divided in classes. These classified objects are then "communicated" to the algorithm and thus taken as a basis for the training of the algorithm. Thus, these classes are to be "learned" by the algorithm. An already trained algorithm is then capable of classifying the detected objects with respect to the learned classes.

Preferably, the training of the algorithm is effected as follows: First, objects are detected in the test image data. Furthermore, the classes are defined. As already explained, the classes differ from each other in the environmental conditions and thus in the scene at the time of capture of the image data. Sensor data is associated with the test image data, which is provided by means of at least one sensor and which characterizes the environmental conditions at the time of capture of the test image data. The detected objects are each associated with a class among the mentioned classes depending on this sensor data. These classified objects are then taken as a basis for training the algorithm. By the use of sensor data of at least one vehicle sensor, the training of the algorithm can be particularly precisely and reliably performed. Namely, the training is based on already classified objects, which have been very precisely classified and thus associated with the respective classes based on the sensor data. Thus, the training can be automatically performed, whereby a plurality of test images can also be used for this training and thus the accuracy and reliability of the trained algorithm can also be improved.

With respect to the time of training, fundamentally, two embodiments can be provided:

The training of the algorithm can be performed in a development phase of the camera system. In this embodiment, the test image data can for example be provided by means of a camera, which is attached to a test vehicle. The sensor data is also provided by means of at least one sensor of this test vehicle at the same time and temporally associated with the test image data.

Additionally or alternatively, the training of the algorithm can also be performed in the operation of the camera system based on image data, which is provided in the operation of the camera system by means of the camera. This approach has the advantage that the algorithm can thus be rendered more precise and thus improved also during the operation, thereby further reducing the probability of an error.

In addition, the invention relates to a camera system for a motor vehicle, wherein the camera system is formed for performing a method according to the invention.

A motor vehicle according to the invention, in particular passenger car, includes a camera system according to the invention.

The preferred embodiments presented with respect to the method according to the invention and the advantages thereof correspondingly apply to the camera system according to the invention as well as to the motor vehicle according to the invention.

Further features of the invention are apparent from the claims, the figures and the description of figures. All of the features and feature combinations mentioned above in the description as well as the features and feature combinations mentioned below in the description of figures and/or shown in the figures alone are usable not only in the respectively specified combination, but also in other combinations or else alone.

Below, the invention is explained in more detail based on a preferred embodiment as well as with reference to the attached drawings.

Figure 2:
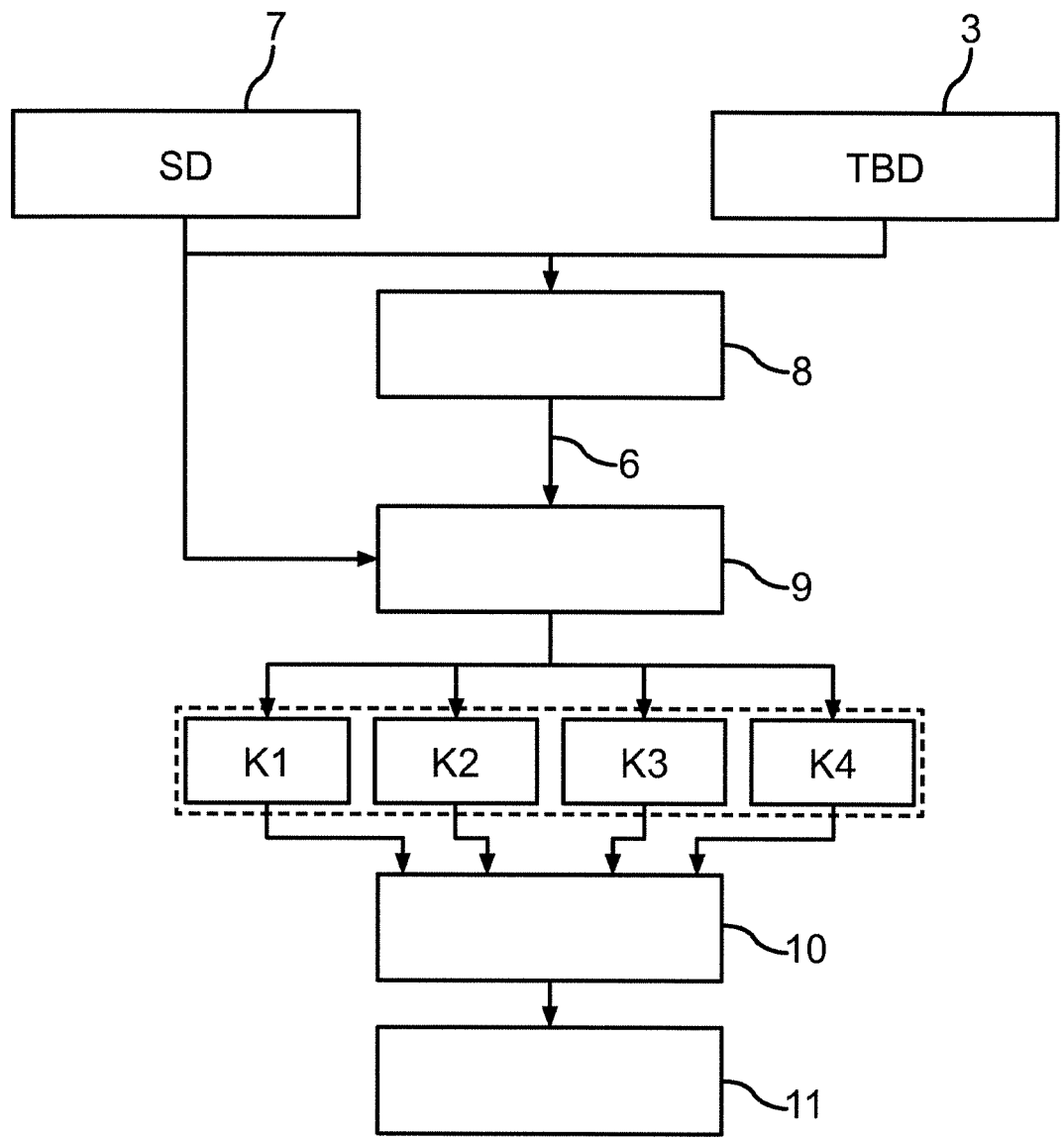
Figure 3:
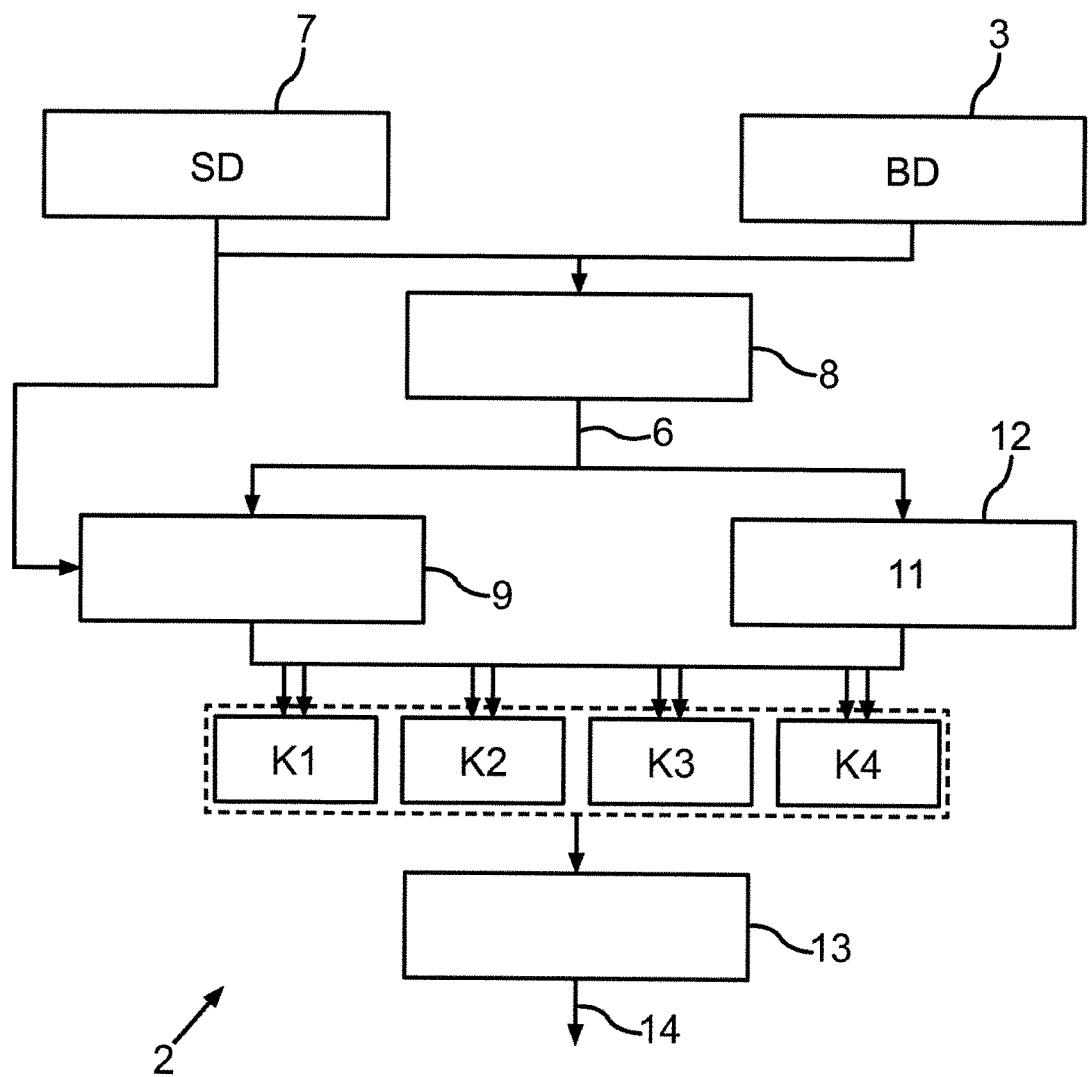
Figure 4:
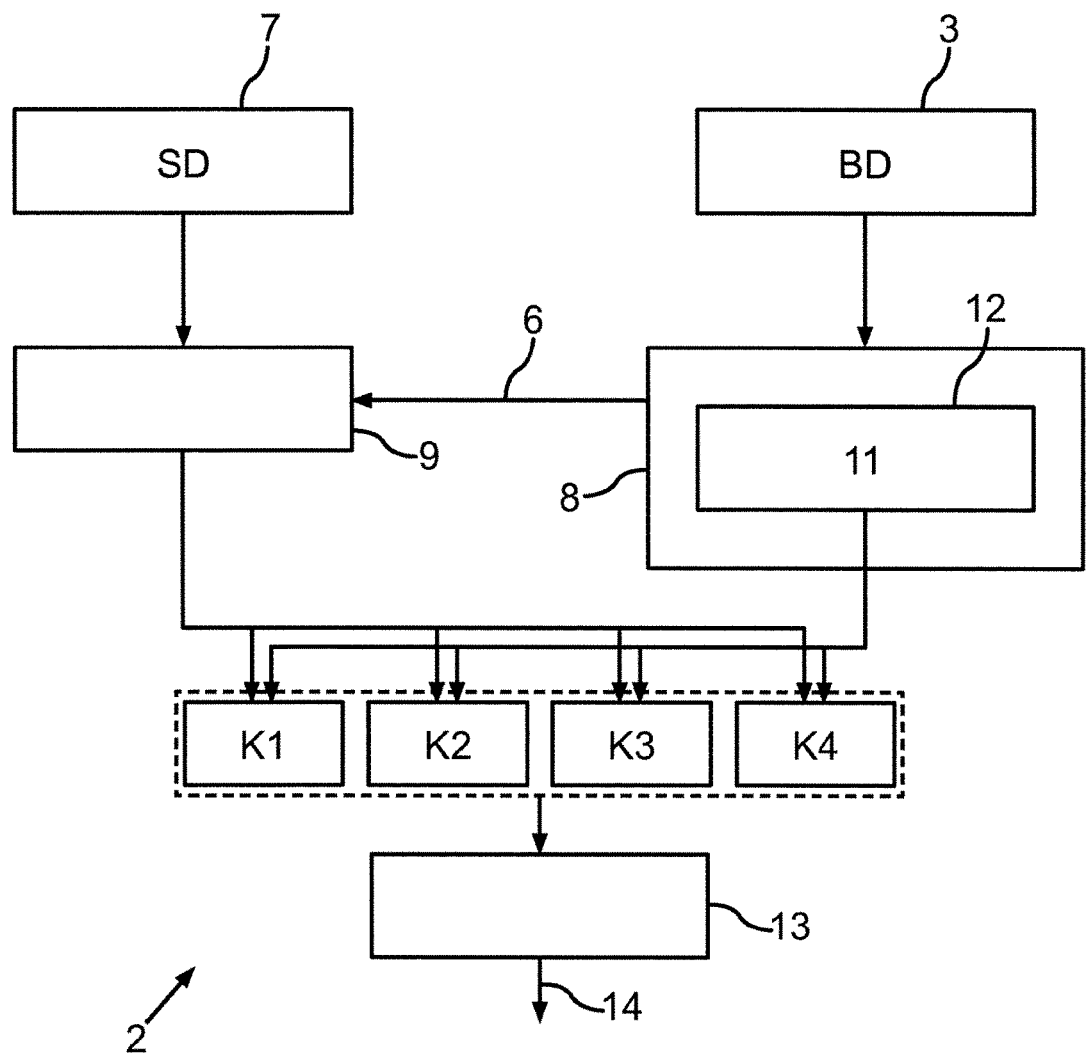

There show:

FIG. 1 in schematic illustration a motor vehicle with a camera system according to an embodiment of the invention; and FIGS. 2 to 4 block diagrams for explaining a method according to an embodiment of the invention.

A motor vehicle 1 shown in FIG. 1 is a passenger car in the embodiment. The motor vehicle 1 includes a camera system 2 serving for example as a collision warning system, by means of which the driver of the motor vehicle 1 can be warned of a risk of collision. Additionally or alternatively, the camera system 2 can be formed as an automatic brake assist system, by means of which the motor vehicle 1 can be automatically decelerated due to a detected risk of collision.

The camera system 2 includes a camera 3, which is formed as a front camera. The camera 3 is disposed in the interior of the motor vehicle 1 on a windshield of the motor vehicle 1 and captures an environmental region 4 in front of the motor vehicle 1. The camera 3 is for example a CCD camera or else a CMOS camera. The camera 3 is additionally a video camera providing a sequence of images of the environmental region 4 and communicating it to an image processing device not illustrated in the figures. This image processing device and the camera 3 can optionally also be integrated in a common housing.

As is apparent from FIG. 1, an object 6, here a target vehicle, is located on a roadway 5 in front of the motor vehicle 1. The image processing device is set up such that it can apply a detection algorithm to the images of the environmental region 4, which is adapted for detecting objects 6. This detection algorithm can for example be stored in a memory of the image processing device and for example be based on the algorithm AdaBoost. Such detection algorithms are already prior art and are not described in more detail here. If the object 6 is detected, thus, it can be tracked over time by the image processing device. To this too, corresponding tracking algorithms are known.

The camera system 2 is formed such that it can perform a diagnosis of the camera system 2 in the operation. To this, a classification device is employed, which is able to classify the detected objects 6 using a predetermined classification model. This classification model represents an algorithm, which is first trained in an "offline" phase (in the development of the camera system 2) and/or in the operation of the motor vehicle 1. For example a HOG classifier and/or an SVM classifier and/or a classification tree method can be used as the algorithm.

A block diagram serving for training the algorithm or the classification model is schematically illustrated in FIG. 2. At least one vehicle sensor 7 (a sensor of a test vehicle and/or a sensor of the motor vehicle 1) provides sensor data SD characterizing the environmental conditions of the motor vehicle. For example, the following sensor data SD is provided:

data indicating a current operating state of a headlight of the motor vehicle 1 (or of the test vehicle), and/or data indicating a current operating state of a windshield wiper of the motor vehicle 1 (or of the test vehicle), and/or sensor data of a rain sensor and/or of a brightness sensor of the motor vehicle 1 (or of the test vehicle).

By means of the camera 3 (it can be attached to the test vehicle and/or to the motor vehicle 1 in FIG. 2), test image data TBD is provided. Both the sensor data SD and the test image data TBD are supplied to an object detection algorithm 8, which can be implemented in the mentioned image processing device. The object detection algorithm 8 detects an object 6 in the image data TBD and delivers it to a splitter 9, which additionally also receives the sensor data SD. The splitter 9 associates the detected object 6 with a class among several predetermined classes K1 to K4 depending on the sensor data SD. This means that the object 6 is classified depending on the environmental conditions and is herein associated with one of the classes K1 to K4.

The classes K1 to K4 can differ from each other in the brightness of the environment and/or in the atmospheric conditions. One of the classes K1 to K4 can be intended for objects 6, which are detected in a dark environment and in rain. Another one of the classes K1 to K4 can be intended for objects 6, which are detected in a bright and dry environment. With which one of the classes K1 to K4 the detected object 6 is associated, is determined depending on the sensor data SD.

Basically, the number of the classes K1 to K4 is not restricted. However, the number of the classes K1 to K4 is determined such that each of the classes K1 to K4 contains a minimum number of objects in training the algorithm.

The classified objects are then supplied to a learner 10 in order to thus generate and train the classification model 11, respectively. The classification model 11 thus represents a classification algorithm and therefore a classifier.

Thus, the above described method serves for training the classification model 11 with the aid of test image data TBD. As already explained, the training can be performed in the development of the camera system 2 and/or in the operation of the motor vehicle 1. Therein, a test vehicle can be used in the development, to which a corresponding camera 3 is attached, which provides the test image data. At least one sensor 7 of this test vehicle then provides the sensor data SD. If the training is performed in the operation of the motor vehicle 1, thus, the test image data is provided by the camera 3 of the motor vehicle 1, while the sensor data SD is provided by means of at least one vehicle sensor 7 of the motor vehicle 1.

In the operation of the camera system 2, then, a diagnosis is performed. A corresponding block diagram is illustrated in FIG. 3: at least one vehicle sensor 7 of the motor vehicle 1 provides current sensor data SD, which can include the above already mentioned data, that is information about the current operating state of the headlight and/or information about the current operating state of the windshield wiper and/or information of a rain sensor and/or information of a brightness sensor. The camera 3 provides current image data BD. Both the sensor data SD and the image data BD are supplied to the object detection algorithm 8, which is implemented in the mentioned image processing device. The object detection algorithm 8 detects an object 6 and communicates the result of the detection to a classification device 12 on the one hand, in which the trained classification algorithm or the classification model 11 is implemented, as well as to the splitter 9 on the other hand. The splitter 9 and/or the classification device 12 can also be implemented in the image processing device.

The splitter 9 additionally receives the current sensor data SD. However, this sensor data SD is not communicated to the classification device 12.

Now, the detected object 6 is classified in two different manners, namely by means of the splitter 9 on the one hand and also by means of the classification model 11 on the other hand. The splitter 9 performs a first classification of the object 6 by associating the object 6 with one of the classes K1 to K4 depending on the sensor data SD. Independently of this and thus independently of the sensor data SD, the object 6 is also classified by means of the classification model 11, which associates the object 6 with one of the classes K1 to K4.

A diagnostic device 13, which can also be implemented in the image processing device, then compares the classification results of the first and the second classification and performs the diagnosis of the camera system 2 depending on the comparison. If a deviation between the classification results is determined, an error signal 14 can be output.

The camera system 2 according to FIG. 4 differs from the camera system 2 according to FIG. 3 in that the classification device 12 with the classification model 11 is a part of the object detection algorithm 8. In this case, the training of the classification model 11 constitutes a part of the system or of the object recognition algorithm 8. Here, the training can only include a corresponding setting of the splitter 9 in order to obtain the same results as with the object detection algorithm 8. An advantage of this embodiment is in the reduction of the computing time by the use of results of the object recognition algorithm 8.

The invention claimed is:

1. A method for performing a diagnosis of a camera system of a motor vehicle, comprising:
   providing at least one image of an environmental region of the motor vehicle by a camera of the camera system;
   detecting at least one object external to vehicle in the at least one image by an image processing device of the camera system;
   providing sensor data by at least one sensor of the motor vehicle, wherein the sensor data characterizes environmental conditions of the motor vehicle;
   first classifying the at least one object and herein associating the object with a class among a plurality of predetermined classes depending on the environmental conditions, wherein the plurality of classes differ from each other with respect to the environmental conditions,
   second classifying the at least one object and herein associating the object with one of the plurality of classes based on the image, and independently of the sensor data, by a classification device using a predetermined classification model; and
   comparing classification results of the first and the second classification and performing a diagnosis depending on the comparison.

2. The method according to claim 1, further comprising:
   generating an error signal by the camera system, when the camera system detects that the object has been associated with a different class by the first classification than by the second classification.

3. The method according to claim 1, wherein the plurality of classes differ from each other in a brightness of the environmental region.

4. The method according to claim 1, wherein the plurality of classes differ from each other in atmospheric conditions of the environmental region.

5. The method according to claim 1, wherein the following data is provided as the sensor data:
   data indicating a current operating state of a headlight of the motor vehicle, and
   data indicating a current operating state of a windshield wiper of the motor vehicle, and
   sensor data of a rain sensor and/or of a brightness sensor of the motor vehicle.

6. The method according to claim 1, wherein a HOG classifier and/or an SVM classifier and/or a classifier based on a classification tree method is used as the classification model.

7. The method according to claim 1, wherein an algorithm is used as the classification model, which is trained with test image data with respect to the classification.

8. The method according to claim 7, wherein the training of the algorithm includes that objects are detected in the test image data and are each associated with one of the plurality of classes depending on sensor data of at least one sensor, which characterizes environmental conditions at the time of capture of the test image data, and wherein the classified objects are taken as a basis for training the algorithm.

9. The method according to claim 7, wherein the training of the algorithm is performed in a development phase of the camera system.

10. The method according to claim 7, wherein the training of the algorithm is performed in the operation of the camera system based on image data, which is provided in the operation of the camera system by the camera.

11. A camera system for a motor vehicle, wherein the camera system is adapted to perform a method according to claim 1.

12. A motor vehicle passenger car comprising a camera system according to claim 11.

* * * * *